Jan. 25, 1938. J. E. PRICE Re. 20,639
COMBINED LOCK AND LATCH
Original Filed June 7, 1934 4 Sheets-Sheet 1
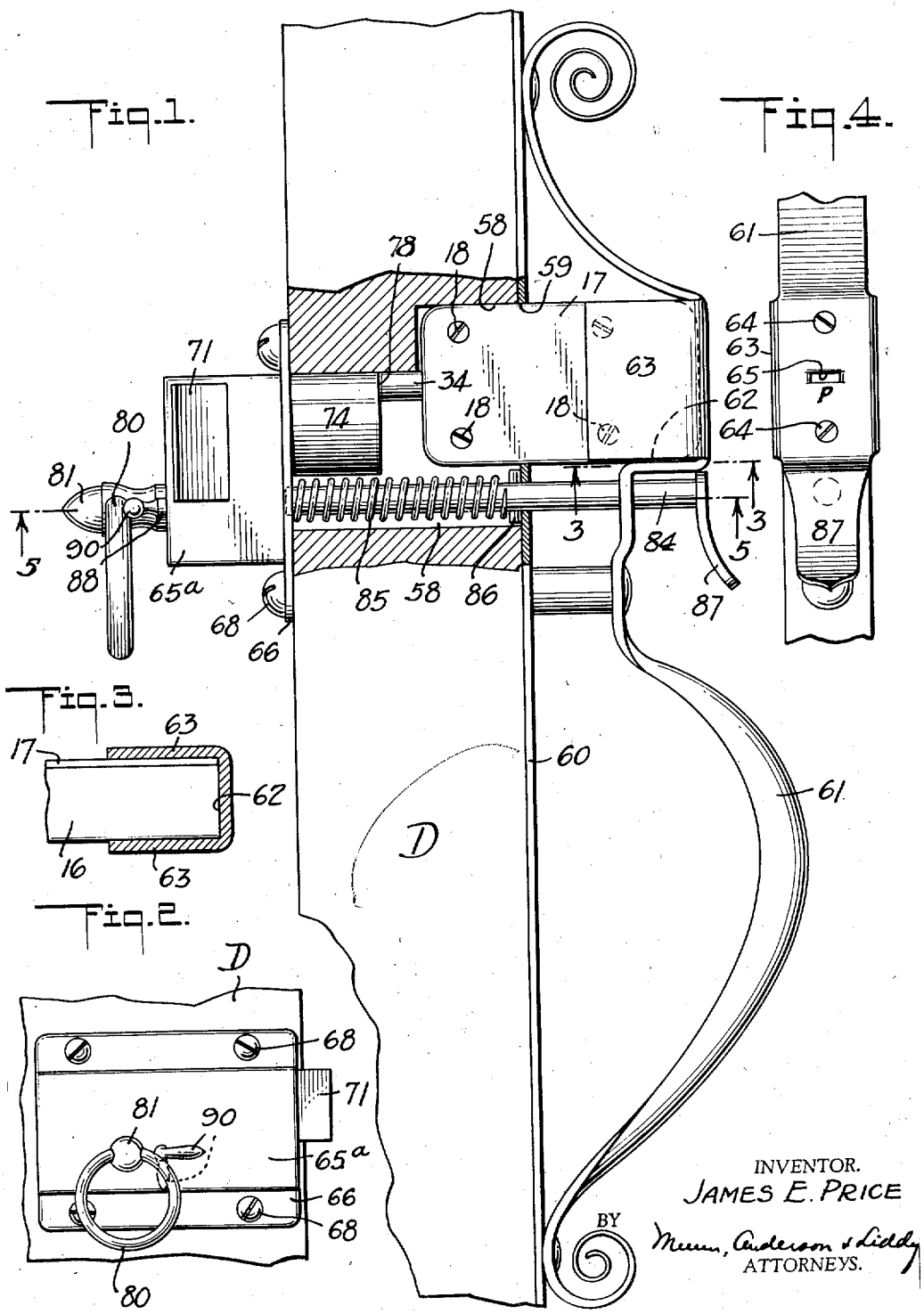
INVENTOR.
JAMES E. PRICE
BY Munn, Anderson & Liddy
ATTORNEYS.

Jan. 25, 1938.

J. E. PRICE

Re. 20,639

COMBINED LOCK AND LATCH

Original Filed June 7, 1934 4 Sheets-Sheet 2

INVENTOR.
JAMES E. PRICE
BY
Munn, Anderson & Liddy
ATTORNEYS.

Jan. 25, 1938. J. E. PRICE Re. 20,639

COMBINED LOCK AND LATCH

Original Filed June 7, 1934 4 Sheets-Sheet 3

INVENTOR.
JAMES E. PRICE
BY
Munn, Anderson & Liddy
ATTORNEYS.

Jan. 25, 1938. J. E. PRICE Re. 20,639

COMBINED LOCK AND LATCH

Original Filed June 7, 1934 4 Sheets-Sheet 4

INVENTOR.
JAMES E. PRICE

BY
Mann, Anderson & Liddy
ATTORNEYS.

Reissued Jan. 25, 1938 Re. 20,639

UNITED STATES PATENT OFFICE 20,639

COMBINED LOCK AND LATCH

James E. Price, Manhattan Beach, Calif., assignor, by direct and mesne assignments, to Burdette Lock Company, a corporation of Nevada Original No. 2,070,619, dated February 16, 1937, Serial No. 729,484, June 7, 1934. Application for reissue August 30, 1937, Serial No. 161,635

15 Claims. (Cl. 70—353)

My invention relates to and has for an object the provision of a key-controlled mechanism adapted to actuate a bolt or other instrumentality and embodying a novel key-operated tumbler system which forms a barrier in the path of movement of a key into the mechanism in such manner as to render the mechanism practically pick-proof and incapable of being operated except by the proper key, all while enabling an enormous number of different arrangements of the tumblers of such system to be obtained as is very desirable commercially and is, in fact, a necessity in order to insure against the operation of the mechanism by other than the proper key.

Another object of the invention is to provide a novel latch for a door or other closure which is combined with the aforestated key-controlled mechanism in such manner as to be selectively operated by the mechanism or manually from the outside or inside of a door.

With these and other objects in view, the invention consists in the construction and arrangement of elements as set forth in the following specification and particularly pointed out in the appended claims.

In the accompanying drawings,

Figure 1 is a view of a portion of a door in end elevation, partly broken away, with the combined lock and latch embodying my invention applied thereto;

Figure 2 is a view of the latch in side elevation;

Figure 3 is a fragmentary horizontal sectional view on the line 3—3 of Figure 1;

Figure 4 is a fragmentary view of a portion of the door handle with which the invention is associated;

Figure 9:
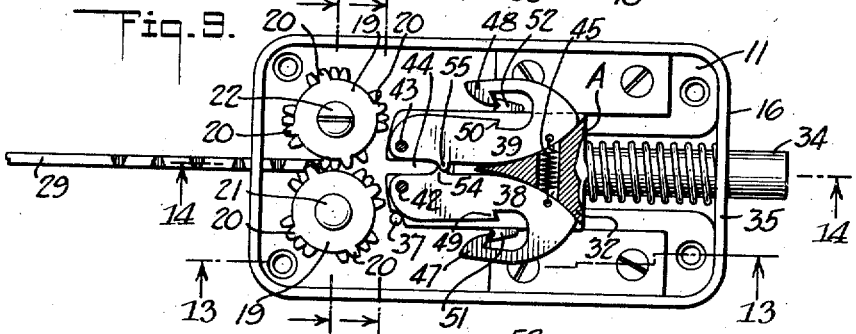
Figure 9 is a view similar to Figure 7, with one of the side plates composing the frame of the mechanism broken away, and showing the locked position of the mechanism.
Figure 17:
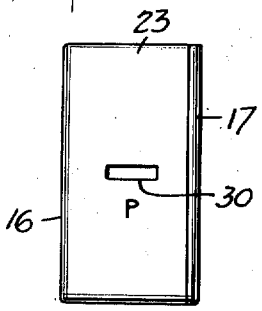
Figure 18:
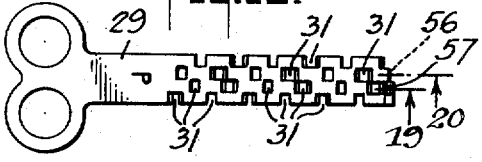
Figure 19:
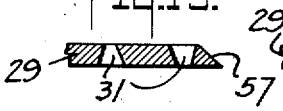
Figure 20:
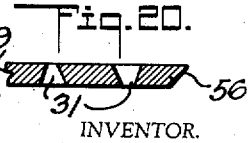

Figures 13, 14, 15 and 16 are sectional views taken, respectively, on the lines 13—13, 14—14, 15—15 and 16—16 of Figure 9, looking in the directions of the respective arrows;

Figure 17 is a view of the key-controlled mechanism in end elevation;

Figure 18 is a view of the key by which the mechanism can be actuated;

Figures 19 and 20 are enlarged fragmentary sectional views taken, respectively, on the lines 19 and 20 of Figure 18.

My invention in its present embodiment comprises a key-controlled mechanism mounted in a frame composed of rectangular side plates 10 and 11 having openings at the corners thereof to freely admit screws 12 which pass through spacer sleeves 13 for definitely spacing the plates apart in parallel relationship. The screws 12 are threaded into bosses 14 projecting from the bottom wall 15 of a cup-shaped casing 16 of rectangular outline to rigidly secure the frame in the casing. A cover plate 17 is secured to the casing 16 by screws 18 which are threaded into openings in the side plate 10, so that the cover and casing co-act to completely enclose the key-controlled mechanism which is mounted between the plates and includes a set of key-operated rotary wards 19. In the present instance, eight of these wards in two correlated groups or series of four each are illustrated, but it is to be clearly understood that a greater or lesser number can be employed, if desired.

The wards 19 are all of identical construction and each is in the form of a disk having four teeth 20 projecting radially from the periphery thereof at ninety degree intervals so as to be equally spaced apart circumferentially. The four wards of one series are rigidly secured in side-by-side abutting relation to a shaft 21, whereas the four wards of the other series are likewise secured to a second shaft 22. The shafts 21 and 22 are journaled in registering openings in the side plates 10 and 11 so as to rotatably mount the two groups of wards between the plates at opposite sides of a medial line $a$ drawn longitudinally through the casing. The shafts are also disposed adjacent one end wall 23 of the casing and are spaced apart a distance such that the teeth of the wards on either shaft will just clear the peripheries of the wards on the other shaft, as clearly shown in Figures 9, 10 and 11.

The wards of each group of four are so arranged circumferentially as to provide a predetermined relationship of the teeth of one ward to the teeth of another; and the two groups of wards are operatively connected for rotation equally in opposite directions by intermeshing gears 24 and 25 fixed to the shafts 21 and 22, respectively, at the outer side of the plate 11. The teeth of the two groups of wards are so arranged relatively as to clear each other during rotation of the shafts, and the relationship of the teeth determines the particular combination or permanent setting of the wards.

Figure 12:
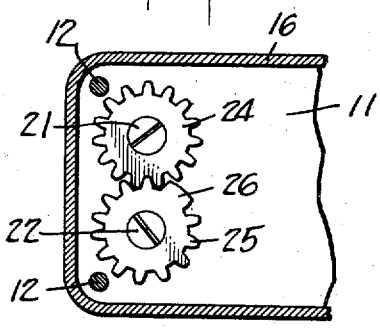
Figure 12 is a fragmentary view in side elevation of a portion of the mechanism from the reverse side.

By reference to Figure 12, it will be noted that one of the teeth of the gear 25 spans two normal teeth so as to co-act with the gear 24 in forming a stop 26 for determining a starting position of the wards to which the wards are normally urged by a flat spiral spring 27 having one end fixed to a pin 28 on the side plate 10, and its other end fixed to the shaft 22. The directions in which the wards of the respective groups are urged to rotate by the spring 27 are indicated by the arrows in Figure 8.

The wards are adapted to be rotated in directions opposed to the arrows and against the action of the spring 27 by a key 29 which is insertable into the casing 16 through a keyhole 30 provided in the end wall 23 of the casing. This key is in the form of a flat bar the width of which is practically equal to the combined thicknesses of the wards of either group, and the thickness of which is slightly less than the spacing between the peripheries of the tumblers of the two groups. At intervals along its length corresponding in relationship and spacing to the teeth of the two groups of wards, the key is provided with openings 31 arranged in four rows as clearly shown in Figure 18, so as to co-act with the teeth of the wards of one group or the other. Thus, upon insertion of the key through the keyhole 30 into the casing with one predetermined side of the key facing a predetermined side of the slot, as indicated by suitable indices P—P on the key and casing, the key can be advanced in a rectilinear path between the wards as the teeth of the latter enter the respective openings 31 of the key and rotate the wards. Any arrangement of the openings 31 not constituting an absolutely accurate flat development of the arrangement of the teeth around the peripheries of the respective wards, will render the key useless as a means to operate the wards. In effect, the key provides a series of racks, the teeth of which are arranged in parallel and side-by-side rows adapted for intermeshing engagement with the teeth of the wards so as to rotate the latter and thus permit the key to be advanced or retracted, as the case may be.

In the present instance, the advancing movement of the key is utilized to release a normally locked actuator A and to impart a rectilinear movement thereto for the purpose of operating a door latch mechanism in a manner to be later described. However, such motion of this actuator can be employed to operate many other instrumentalities.

The actuator A comprises a flat rectangular body 32 slidably mounted between the side plates 10 and 11 and between guides 33—33 on the latter plate for reciprocating motion, the body having at its end remote from the ward assembly an extension in the form of a pin 34 which projects freely through an opening in the end wall 35 of the casing 16. The actuator is urged to the retracted position shown in Figure 8 by a coil spring 36 surrounding the pin 34, and against a stop 37 projecting from the inner side of the plate 11.

The actuator A carries a pair of locking members 38 and 39 which are in the form of flat arms working in laterally offset slots 40 and 41 in opposite sides of the body 32 and pivotally mounted on pins 42 and 43, respectively, at that end of the body confronting the ward assembly and disposed at opposite sides of a longitudinal medial slot 44 into which the forward end of the key 29 is adapted to be inserted.

Figure 8:
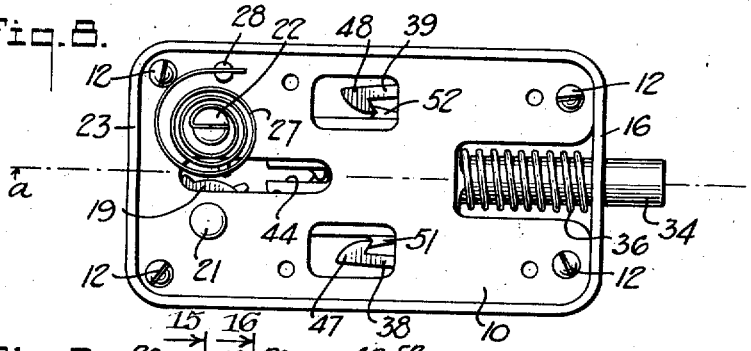
Figure 8 is a view of the key-controlled mechanism in side elevation with a cover plate of the enclosing casing thereof removed.

The locking members 38 and 39 are normally urged inwardly of the body to the locking position shown in Figure 8 by a coil spring 45 connected to the members adjacent their free ends and passing freely through a transverse bore 46 in the body 32. The locking members are respectively provided with outer locking dogs 47 and 48 and inner locking dogs 49 and 50, which are correlated with locking lugs 51 and 52, projecting from the guides 33 at opposite sides of the body 32.

Figure 11:
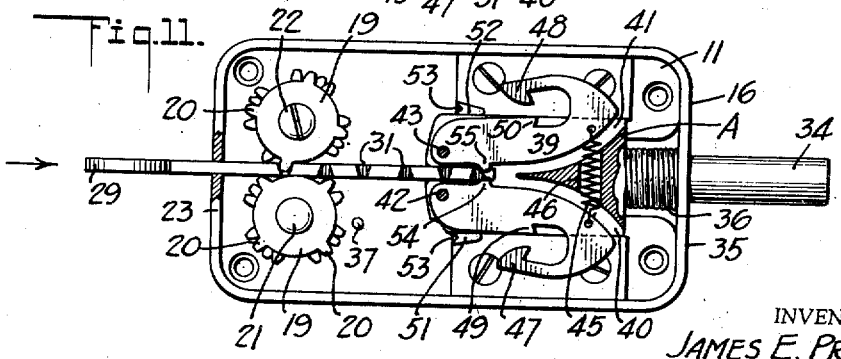
Figure 13:
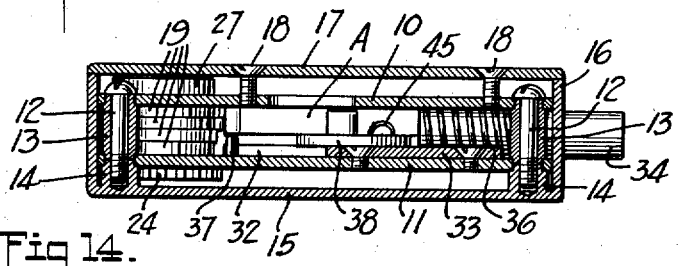
Figure 14:
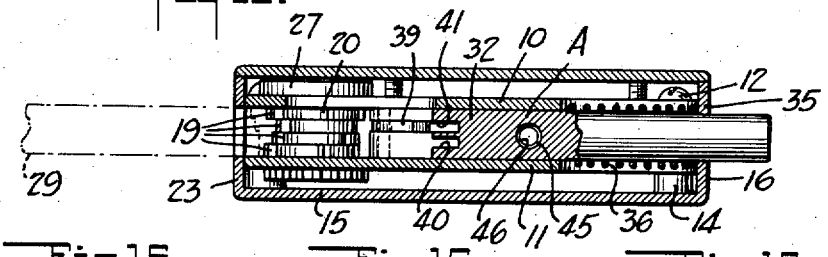
Figure 15:
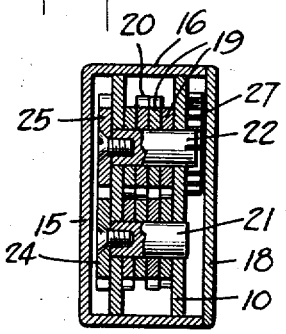
Figure 16:
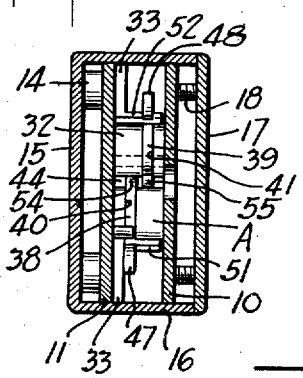

The several locking dogs are in the form of hooks; and in the locking position shown in Figure 9, the outer dogs 47 and 48 are disposed to co-act with V-shaped notches 53 in the lugs 51 and 52, in locking the actuator against advancing movement towards the projected position shown in Figure 11. It will be noted that the outer dogs are arranged to move into locking engagement with the lugs 51 and 52 from the outer sides of the latter and that the inner dogs are arranged to move into locking engagement with the respective lugs from the inner sides of the latter so that it can be said that the lugs are arranged intermediate the outer and inner dogs of the respective locking members.

Figure 10:
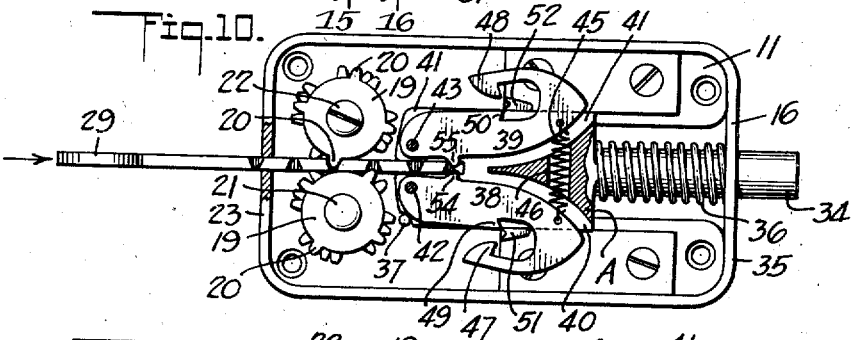
Figures 10 and 11 are views similar to Figure 9 and illustrating different positions of the mechanism during operation thereof by the key.

Projecting respectively from the locking members 38 and 39 adjacent their pivoted ends so as to be disposed side by side within the slot 44 when the members occupy the locked position shown in Figure 9, are cam lugs 54 and 55 adapted to be engaged, respectively, by the oppositely beveled surfaces 56 and 57 formed on the forward end of the key 29, for co-action therewith in response to advancing movement of the key in the slot 44, to rock the locking members about the pins 42 and 43 to the released position shown in Figure 10 and wherein the outer dogs 47 and 48 clear the locking lugs 51 and 52.

In this released position, the inner dogs 49 and 50 also clear the locking lugs 51 and 52 so that as advancing movement of the key is continued the actuator A will be correspondingly moved by the key to the projected position shown in Figure 11, and against the action of the spring 36. Upon the withdrawal of the key, the actuator will be returned by the spring 36 to the retracted position shown in Figure 9.

When the key 29 is withdrawn from the casing, it will be clear that those teeth of the wards 19 which span the key-receiving space between the wards in the initial or starting position of the latter effectively close such space as to prevent the insertion of a picking or other instrument in an effort to release the locking members 38 and 39. Should any of such teeth be damaged or broken off so as to permit the insertion of a wire, for example, it will be practically impossible to actuate both locking members the proper and equal amounts to simultaneously release their outer dogs 47 and 48 from the locking lugs 51 and 52, as one or both will be moved an incorrect amount to either retain one or both of the outer dogs in engagement with the locking lugs or cause one or other of the inner dogs 49 and 50 to be moved into locking engagement with said locking lugs. The mechanism is thus practically pick-proof so as to positively insure that only the proper key can be used for its operation.

In Figures 1 to 7, inclusive, the key-controlled mechanism above described is shown associated with a door latch in a manner to utilize the movement of the actuator A from retracted to projected position, in actuating the bolt of the latch. In this application of the mechanism, the end of its casing 16 from which projects the pin 34 is extended into a recess 58 Figure 1 in a door D from the outer side of the latter and adjacent its free edge. The casing passes through a slot 59 in an escutcheon plate 60 secured to the door and having fixed thereto an ornamental handle 61. The lower portion of the handle below that portion which is adapted to be grasped in moving the door is constructed of flat bar or strip metal and is provided with a recess 62 receiving the outer or exposed part of the casing 16 between protective cheek plates 63—63, the casing being rigidly secured to such portion of the handle by screws 64—64, which portion is provided with a keyhole 65 registering with the keyhole 30 of the casing for the insertion of the key 29, all as shown in Figures 1, 2 and 3.

The door latch previously referred to comprises a rectangular casing 65*a* including a back cover plate 66 secured thereto by screws 67, the cover plate and casing being rigidly secured as a unit to the inner side of the door D by screws 68 passing through projecting portions of the cover plate 66.

Reciprocatably mounted in the casing 65*a* in guides 69 and 70 for rectilinear movement to occupy projected and retracted positions, is a latch bolt 71 provided intermediate its ends with an oblique extension 72 working in a cam slot 73 extending obliquely in a cylindrical body 74 reciprocably mounted on a fixed stud 75 for rectilinear movement in a path at a right angle to the path of movement of the latch bolt 71 so that according as the body 74 is moved to one extreme position or another the extension 72 and the cam slot 73 will coact in moving the latch bolt to projected or retracted position. The extension is bifurcated at 76 to freely receive the reduced portion of the body 74 spanning the cam slot 73, and the body is urged by a spring 77 on the stud 75 to the extreme position shown in Figure 5 and wherein the latch bolt occupies its projected position determined by a stop pin 77*a*.

Figure 5:
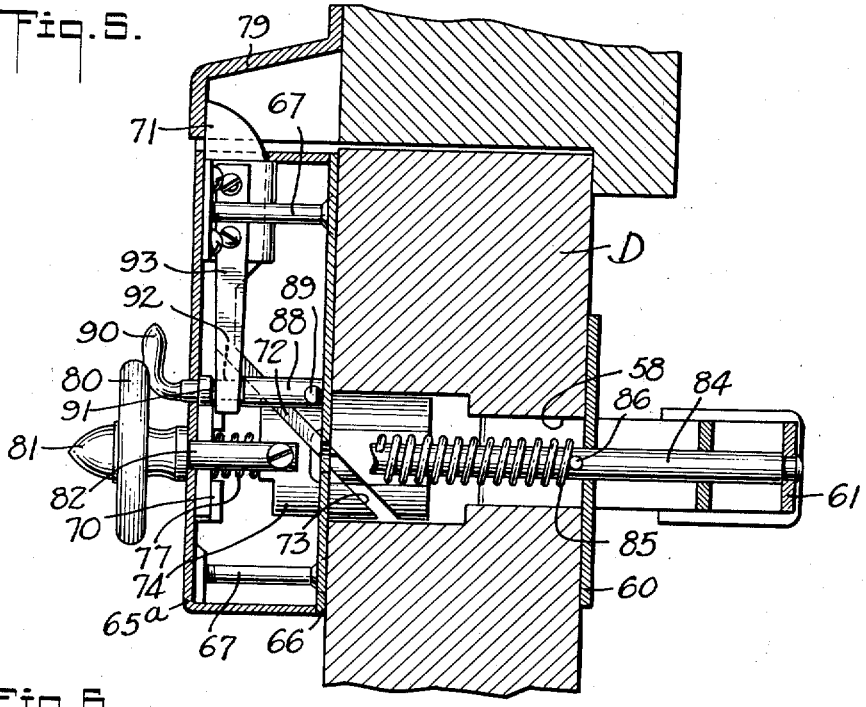
Figure 5 is a horizontal sectional view taken on the line 5—5 of Figure 1.
Figure 6:
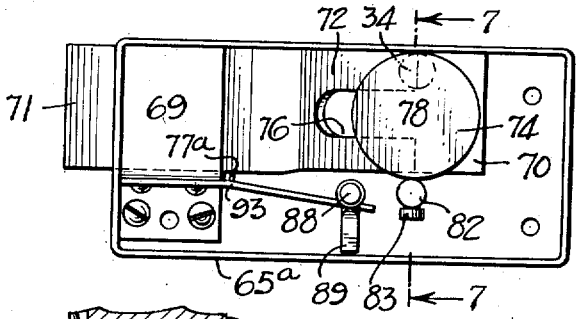
Figure 6 is a view of the latch from the reverse side to that shown in Figure 2, and with a cover plate of the enclosing casing removed.
Figure 7:
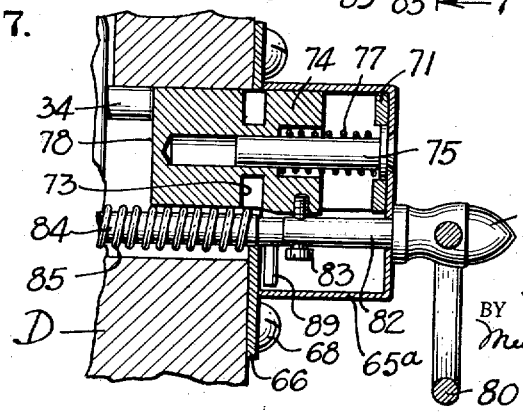
Figure 7 is a vertical transverse sectional view taken on the line 7—7 of Figure 6.

A portion of the outer end of the body 74 which provides a flat face or abutment 78 is disposed in the path of movement of the pin 34 of the actuator A so as to be engaged and moved thereby from the extreme position shown in Figures 1 and 6 when the actuator A is moved by the key 29 from the position shown in Figure 9 to that shown in Figure 11, whereby the extension 72 and the cam slot 73 will co-act in moving the bolt to its retracted position out of engagement with the usual keeper 79 in the door jamb. When the key is withdrawn, the spring 77 will restore the bolt to projected position.

The bolt can be manually retracted from the inner side of the door D by a pull ring 80 fixed to the head 81 of a pin 82 passing through an opening in the casing 65*a* and connected interiorly of the latter to the body 74 by a screw 83.

The bolt can also be manually retracted from the outer side of the door should it be desired to leave the door unlatched. For this purpose, a rod 84 is mounted in the handle 61, escutcheon plate 60 and back cover plate 66 of the casing 65, so as to be disposed in alinement with the pin 82 of the pull ring 80. The rod 84 is normally urged axially in a direction towards the outer side of the door D by a coil spring 85 surrounding the rod between the cover plate 66 and a diametric pin 86 projecting from the rod and adapted to engage the escutcheon plate 60 to limit the movement of the rod in said direction. The outer end of the rod is provided with a finger piece 87 adapted to be pressed to actuate the rod and cause the latter to engage and move the pin 82 in the same direction as the latter is moved by pulling upon the ring 80, so that by virtue of the operative connection between the pin and the body 74, the bolt will be retracted.

In order to render the rod inoperative so that the door can only be opened from the outside by the key 29, a rock shaft 88 is journaled in the casing 65*a* and cover plate 66 and is provided with a radial projection 89. Exteriorly of the casing 65*a*, the shaft is provided with an operating arm 90 by which it can be manually rocked to cause the projection 89 to occupy either active or inactive position. In its active position the projection 89 is interposed between the confronting ends of the pin 82 and the rod 84 so that movement of the latter by the finger piece 87 will be positively prevented. In its inactive position, the projection 89 is entirely clear of the path of movement of the rod 84 by the finger piece 87 so that the rod will be operative. The shaft 88 is provided with angularly related flat faces 91 and 92 which are adapted to be engaged by the free end portion of a flat spring 93 secured at its other end to the guide 69, so that the spring will co-act with one face or the other to releasably retain the projection in active or inactive position.

An important feature of my invention resides in the provision of relatively rotatable elements or ward groups, each of which is characterized by simple, inexpensive stampings in the form of identical flat, circular disks of which there may be as many per element or group as desired for different key combinations. Each disk has a desired number of circumferentially spaced apart radial teeth. The companion ward groups are disposed relative to each other to insure constant maintenance of a key-way of uniform width between the peripheral surfaces of said disks, into which extend, (regardless of the degree of rotation of one group relative to the other) one or more teeth of each group such that the key-way will always be occupied by a similar series of teeth. It is noted that teeth of each group employed has a length barely slightly less than the width of said key-way and that the teeth of one group never at any time contact any part whatsoever of the other group. By reason of this arrangement of the teeth, it follows that the moment any tooth of any group is pressed against by an object other than a proper key and both groups started in rotative motion, one, and possibly more teeth of each group will be advanced circumferentially into firm clamping impingement against an adjacent side of said object. The force of the tooth impingement against the object is always proportional to the degree of manual pressure imposed against the object. Advancing motion of the object will thereby be positively stopped the moment the limit of relative rotation of the two groups is reached. Ordinarily, this is instantaneous due to the circumferential relationship of the teeth to each other on the disks of both groups.

I find in practice that by stamping the toothed disks from suitable gauge sheet steel, the teeth function substantially like punching or cutting dies and either materially indent and distort the object or else sever one portion thereof from the other, in any event, always stopping the wards from relative rotation in an effective object advancing direction. To the best of my knowledge, I am the first in the art to provide two ward groups wherein teeth on one group never enter or directly engage the other group and wherein the teeth on each group each has a length, barely less than the width of an intervening key-way between said groups. I furthermore stress the fact that said disks are very inexpensive and are adapted readily and by slight changes in their relative positions circumferentially, to enable an almost unlimited number of different key combinations to be had, a feature which I believe is also new in the art.

By reason of the relationship of the ward groups to each other, it is a fact, regardless of the shape or diameter of a spurious object attempted to be forced between the groups, coaction of the toothed disks to stop successful advancement of the object is the same. If the object is small like a steel sewing needle, its motion will be arrested by a tooth of a disk of one ward group forcing the needle against a smooth peripheral surface of a disk of the other group. If the object be larger, its motion will be stopped by the clamping effect of one or more teeth of one or more disks of both ward groups thereagainst. Thus the device, so to speak, automatically is a check against entry of various sizes of spurious objects through the keyway of the device. This again, obviously is due to the close order of relationship of the disks to each other and to the fact that there is at no time more than a scant or machine clearance between the tip of any tooth of a disk of one ward group and a directly opposite smooth peripheral surface of a disk of the companion group.

What is claimed is:

1. Mechanism of the class described comprising a plurality of identical wards having circumferentially spaced teeth; means for mounting the wards in two groups for rotary movement about axes arranged side by side with the wards of one group spaced from those of the other group sufficiently to provide for the passage of the teeth of the respective wards and for the insertion of a key therebetween to co-act with the teeth in rotating the wards; means for operatively connecting the groups of wards to synchronize rotation of the groups in opposite directions; and means for urging the two groups of wards to rotate to a pre-determined starting position.

2. Mechanism of the class described comprising a plurality of structurally identical flat disk-like wards having circumferentially spaced teeth projecting from the peripheries thereof; means for mounting the wards in two groups for rotary movement about axes arranged to interrelate the teeth of the groups for co-action with a key in rotating the wards in order to permit the key to be advanced therebetween; means for operatively connecting the groups of wards to synchronize rotation thereof in opposed directions; and means for urging the two groups of wards to rotate to a predetermined starting position.

3. Mechanism of the class described comprising a plurality of structurally identical flat disk-like wards having teeth arranged at predetermined locations about the peripheries thereof; two rotatably mounted shafts to which said wards are fixed so as to be arranged side by side in two groups with the teeth of the groups interrelated for co-action with a key in rotating the wards in order to permit the key to be advanced therebetween; intermeshing gears fixed to the shafts to synchronize rotation of the two groups of wards in opposed directions; and means for urging the two groups of wards to rotate to a predetermined starting position.

4. Mechanism of the class described comprising a plurality of wards having circumferentially spaced teeth; means for mounting the wards in two groups for rotary movement about axes arranged side by side with the wards of one group spaced from those of the other group sufficiently to provide for the passage of the teeth of the respective wards and for the insertion of a key therebetween to co-act with the teeth in rotating the wards; means for operatively connecting the groups of wards to synchronize rotation of the groups in opposite directions; means for urging the two groups of wards to rotate to a predetermined starting position; an actuator; means for normally locking the actuator; and means adapted for operation by the key as the latter is advanced between the groups of wards, to unlock the last means for movement of the actuator by the key.

5. Mechanism of the class described comprising a plurality of wards having circumferentially spaced teeth; means for mounting the wards in two groups for rotary movement about axes arranged side by side with the wards of one group spaced from those of the other group sufficiently to provide for the passage of the teeth of the respective wards and for the insertion of a key therebetween to co-act with the teeth in rotating the wards; means for operatively connecting the groups of wards to synchronize rotation of the groups in opposite directions; means for urging the two groups of wards to rotate to a predetermined starting position; a reciprocably mounted actuator; means including locking members carried by the actuator for locking the latter in a retracted position; and means on the locking members disposed for engagement and operation by the key when advanced between the groups of wards, to release the locking members so as to enable the key to advance the actuator to a projected position.

6. Mechanism of the class described comprising a plurality of wards having circumferentially spaced teeth; means for mounting the wards in two groups for rotary movement about axes arranged side by side with the wards of one group spaced from those of the other group sufficiently to provide for the passage of the teeth of the respective wards and for the insertion of a key therebetween to co-act with the teeth in rotating the wards; means for operatively connecting the groups of wards to synchronize rotation of the groups in opposite directions; means for urging the two groups of wards to rotate to a predetermined starting position; a reciprocably mounted actuator; locking members movably mounted on the actuator and having locking dogs; stationary locking lugs with which said dogs co-act to lock the actuator in a retracted position; and means on the locking members adapted to be engaged by the key when advanced between the groups of wards, to release the locking members so as to enable the key to advance the actuator to a projected position.

7. Mechanism of the class described comprising a plurality of wards having circumferentially spaced teeth; means for mounting the wards in two groups for rotary movement about axes arranged side by side with the wards of one group spaced from those of the other group sufficiently to provide for the passage of the teeth of the respective wards and for the insertion of a key therebetween to co-act with the teeth in rotating the wards; means for operatively connecting the groups of wards to synchronize rotation of the groups in opposite directions; means for urging the two groups of wards to rotate to a predetermined starting position; a reciprocably mounted actuator; locking members pivotally mounted on the actuator and having inner and outer locking dogs; stationary locking lugs with which said locking dogs are adapted to co-act; means for normally urging the locking members to positions wherein the outer locking dogs will coact with said lugs to lock the actuator in a retracted position; and means on the locking members adapted to be engaged by the key when advanced between the groups of wards, to move the locking members sufficiently to release the outer locking dogs from said lugs while the inner locking dogs remain clear of the lugs so as to enable the key to advance the actuator to a projected position.

8. Mechanism of the class described comprising a plurality of wards having circumferentially spaced teeth; means for mounting the wards in two groups for rotary movement about axes arranged side by side with the wards of one group spaced from those of the other group sufficiently to provide for the passage of the teeth of the respective wards and for the insertion of a key therebetween to co-act with the teeth in rotating the wards; means for operatively connecting the groups of wards to synchronize rotation of the groups in opposite directions; means for urging the two groups of wards to rotate to a predetermined starting position; a reciprocably mounted actuator; locking members pivotally mounted on the actuator and having inner and outer locking dogs; stationary locking lugs with which said locking dogs are adapted to co-act; means for normally urging the locking members to positions wherein the outer locking dogs will co-act with the said lugs to lock the actuator in a retracted position; and means defining cam surfaces on the locking members adapted to be engaged by the forward end of the key when advanced between the groups of wards, to move the locking members sufficiently for the outer locking dogs thereof to be released from said lugs while the inner locking dogs remain clear of the lugs, whereby to enable the key to advance the actuator to a projected position.

9. Mechanism of the class described comprising a plurality of wards; means for mounting the wards for rotation; means on the wards with which a key is adapted to co-act to rotate the wards in order to enable the key to be advanced in a linear path; a reciprocably mounted actuator; a locking member carried by the actuator and having a locking dog; a stationary lug with which said dog is adapted to co-act to lock the actuator in a retracted position; and means on the locking member adapted to be engaged by the key during advancing movement thereof, to move the locking member and unlock the said dog from said lug, whereby to free the actuator for movement to a projected position by the key.

10. In a key guide for locks, identical relatively rotatable elements having peripheral surfaces opposed to each other and always providing a key-way of constant width therebetween, said elements provided with teeth, the length of each of which is less than the width of the key-way, the teeth of both elements formed and related to each other to coact with a proper key and enable free relative rotation of the elements and unimpeded advancement of said proper key through the key-way and adapted when any thereof is pressed against by an object other than said proper key to set up but enable only slight relative rotation of the elements and cause the object to be firmly gripped and held by both elements.

11. In a key guide for locks, relatively rotatable elements, each having toothed peripheral surfaces opposed to each other and providing a key-way therebetween for a key of predetermined thickness, the teeth of said surfaces arranged in axially spaced apart circular series with teeth of one element always in coaction with teeth of the other element to substantially block the entire area of the key-way against passage therethrough of any object other than a proper key, the length of any tooth of any element being slightly less than the width of the key-way and adapted when contacted and pressed against by said object to cause coaction between both elements and thereby firmly secure the object between said elements.

12. In a key guide for locks, a pair of relatively rotatable, structurally identical, cylindrical elements disposed parallel to and spaced apart from each other to provide a key-way therebetween, each element having equal length circumferentially spaced apart teeth, the teeth of one element related to each other and to those of the other element so that one or more teeth of said one element coact with one or more teeth of the other element to provide a series of teeth at the key-way adapted to coact with a proper key and enable uninterrupted advancement thereof through the key-way and whereby upon application of pressure against any tooth of an element by an object other than said proper key, relative rotation of the elements will be effected to cause clamping engagement of the elements with said object.

13. A key guide for locks comprising a pair of structurally identical relatively rotatable, cylindrical elements, spaced apart from each other to provide a key-way therebetween and each having an annular series of radial teeth, the length of each of which is less than the width of said key-way, the teeth of one element bearing a relationship to those of the other element so that a tooth of one element always coacts with a tooth of the other element to provide obstructions at the key-way and so disposed with respect to each other as to be engaged and pressed against by an object other than a proper key and effect rotational motion of one element relative to the other and clamping engagement of both elements against said object.

14. As a new article of manufacture, a ward group for locks comprising a rotatable element having a plurality of identical peripherally toothed disks disposed in coaxial side by side relation to each other and each having peripheral teeth and said disks arranged circumferentially to provide a predetermined relationship of the teeth of one disk to the teeth of another disk.

15. A key guide for locks comprising a plurality of ward elements; means disposed and adapted to coact therewith to provide a keyway; said ward elements being substantially flat and disposed in abutting relation to each other and adapted to move about a common supporting axis, the combined width of the ward elements being coextensive with that of the keyway, each ward element having a plurality of teeth disposed so that a tooth of any ward element coacts with a tooth of any other ward element to always completely block the keyway and serving when pressure of an object other than a proper key is imposed thereagainst to tilt the ward element of which it is a part and advance another tooth of said ward element across the keyway and relative to said coacting means to securely grip said object between said other tooth and said means to thereby stop advancement of said object past said ward elements.

JAMES E. PRICE.